United States Patent [19]
Johnson

[11] Patent Number: 6,006,874
[45] Date of Patent: Dec. 28, 1999

[54] MECHANICAL ENERGY ABSORBER

[76] Inventor: Bruce H. Johnson, 1875 E. Co. Rd. F., White Bear Lake, Minn. 55110

[21] Appl. No.: 09/025,383

[22] Filed: Feb. 18, 1998

Related U.S. Application Data

[60] Provisional application No. 60/039,526, Mar. 3, 1997.

[51] Int. Cl.$^6$ ........................................... F16F 15/00
[52] U.S. Cl. ..................... 188/378; 267/136; 267/182; 188/382
[58] Field of Search ................................ 188/378, 379, 188/380, 382, 371–377; 267/136, 182; 74/574

[56] References Cited

U.S. PATENT DOCUMENTS

| | | | |
|---|---|---|---|
| 5,550,335 | 8/1996 | Ermert et al. | 188/378 |
| 5,746,419 | 5/1998 | McFadden et al. | 188/377 |

*Primary Examiner*—Douglas C. Butler
*Attorney, Agent, or Firm*—Jacobson & Johnson

[57] ABSTRACT

A mechanical stop for a moving body that minimizes bounce of the moving body after the body has hit the stop. The mechanical stop includes a flat plate having a plurality of generally triangular sectors defined by radial slits. The slits or triangular sectors prevent excessively large diaphragm stresses in the material of the plate and also reflect the flexural waves in the plate in such a way that the waves have difficulty returning to the contact area where the moving body has hit the stop and are maximally dissipated by internal friction of the plate. The mechanical stop may include a lever between the moving body and the flat plate to change the effective mass of the moving body, a spring to mediate the impact of the moving body, a relatively rigid support for the lever to minimize moments produced in a base for the flat plate, and straight line plate supports for some or all of the sectors of the flat plate to provide desirable reflections for the flexural waves in the plate.

20 Claims, 17 Drawing Sheets

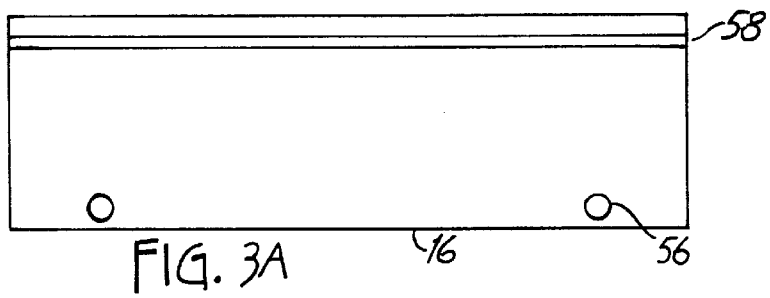
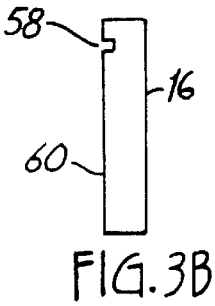
FIG. 3A   FIG. 3B
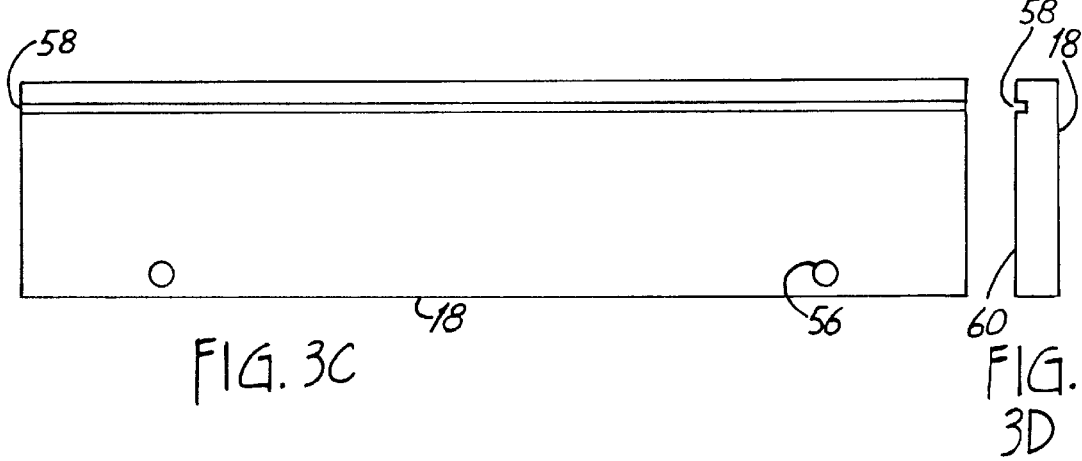
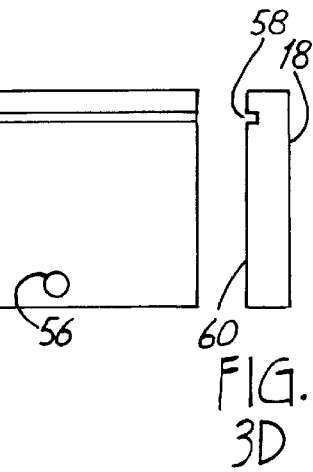
FIG. 3C   FIG. 3D

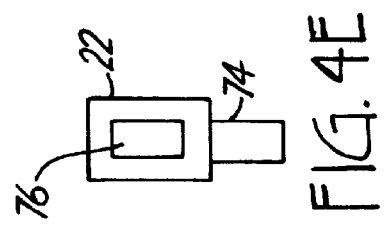
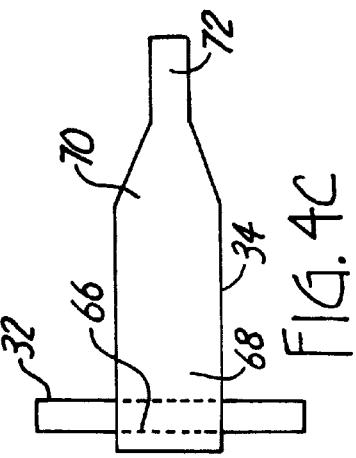
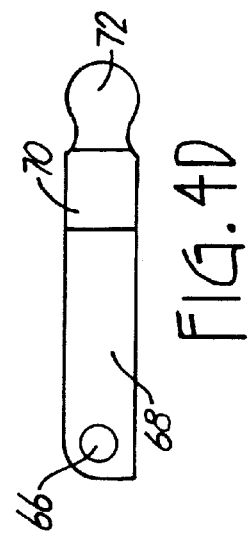
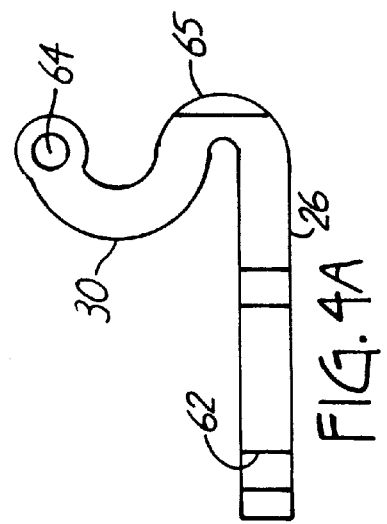
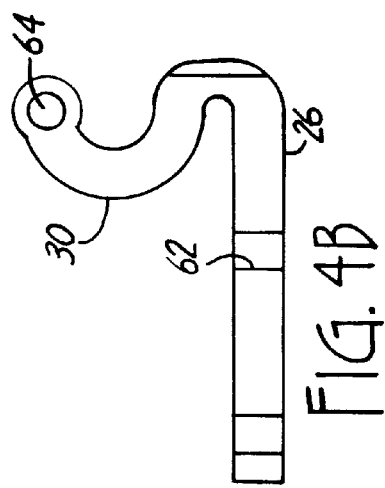

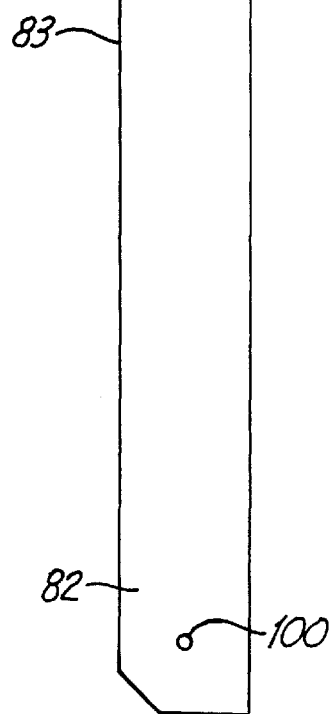
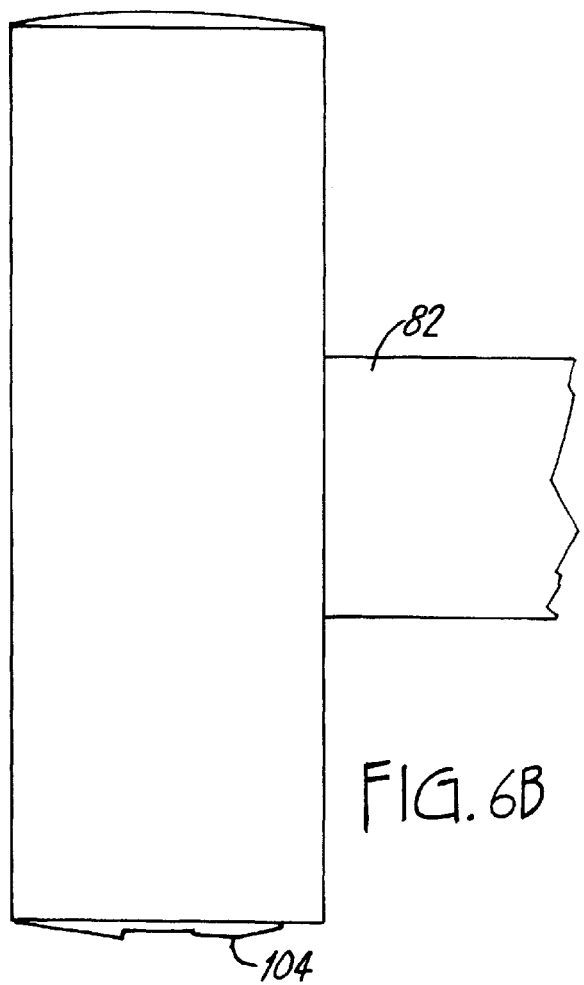
FIG. 6A
FIG. 6B

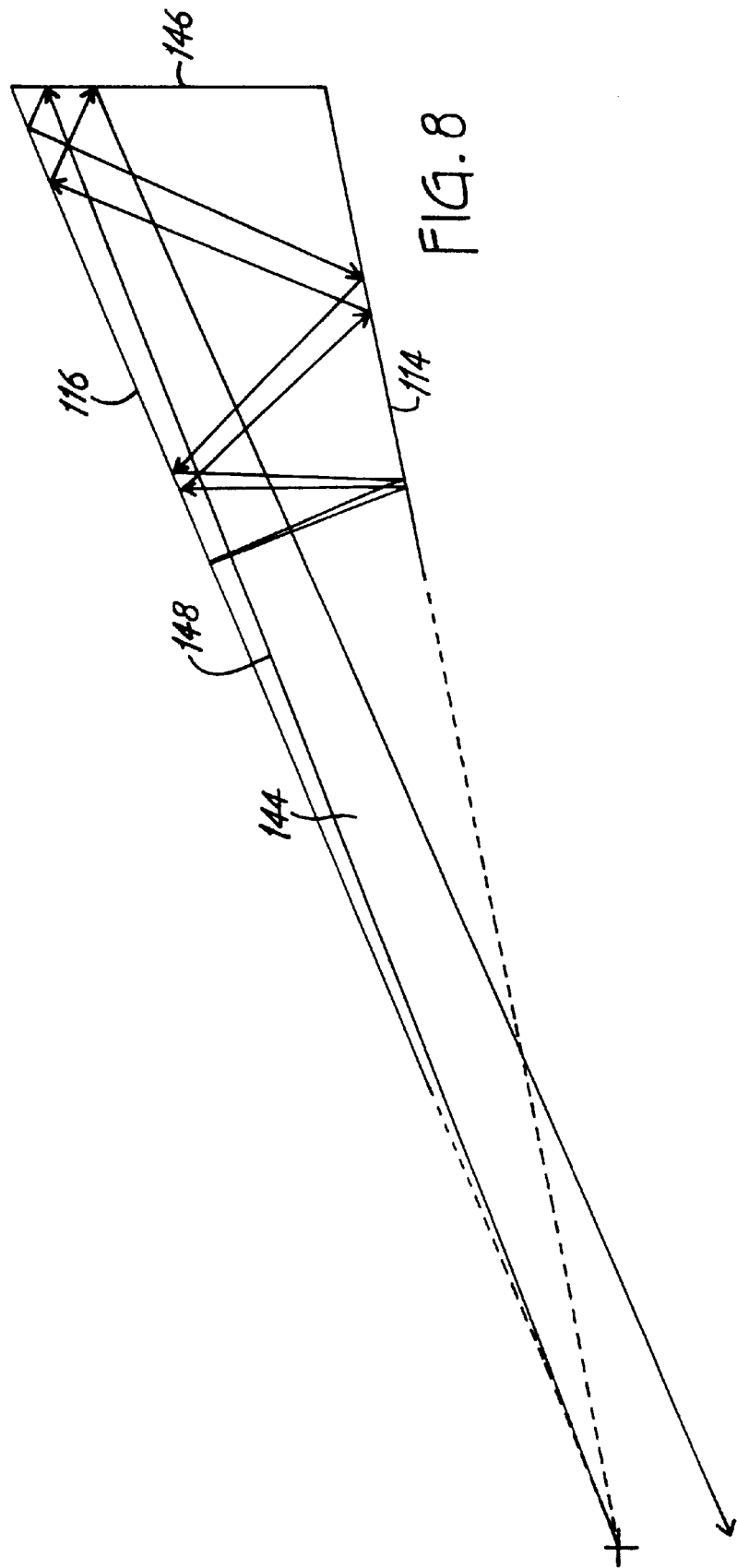

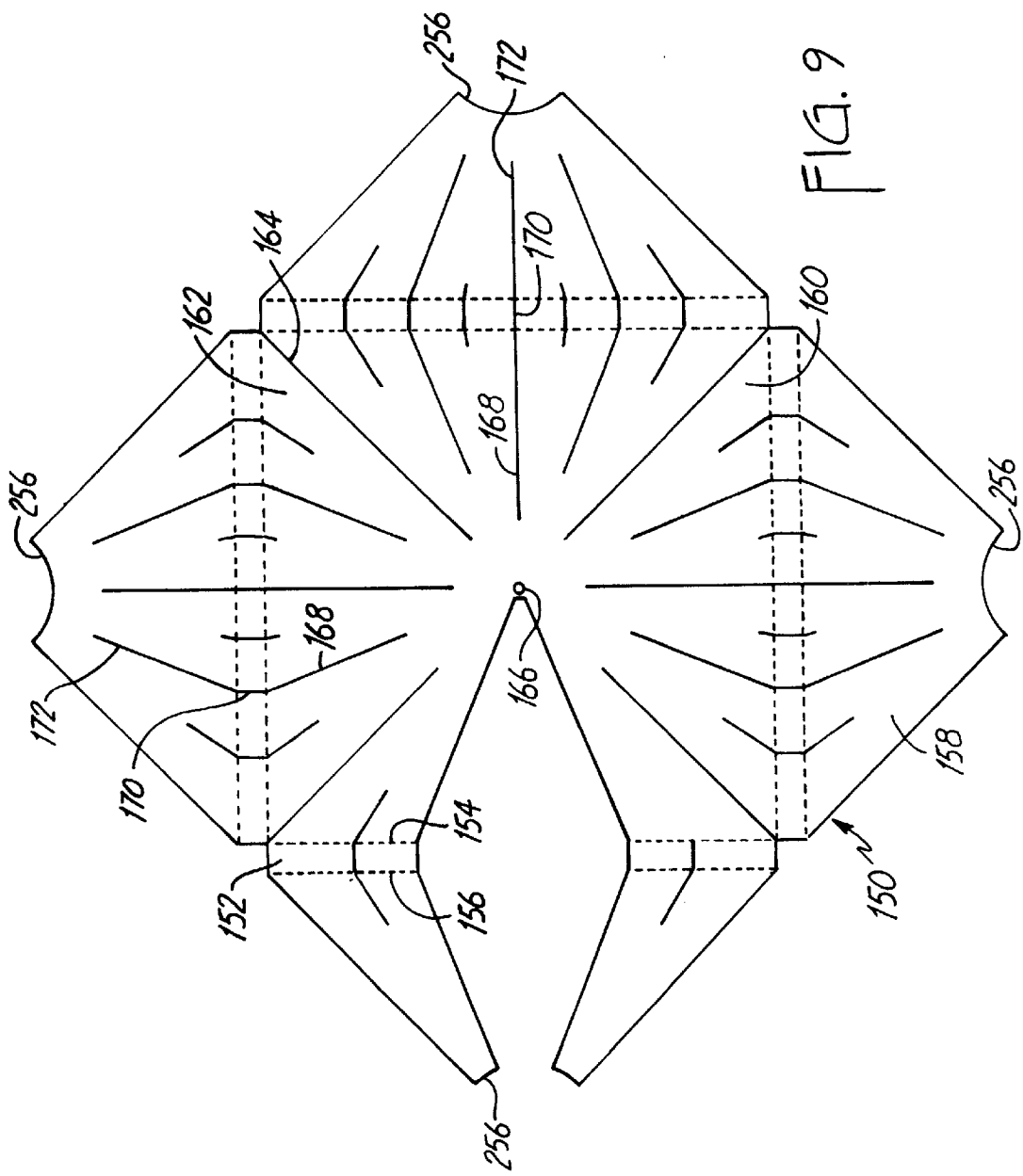

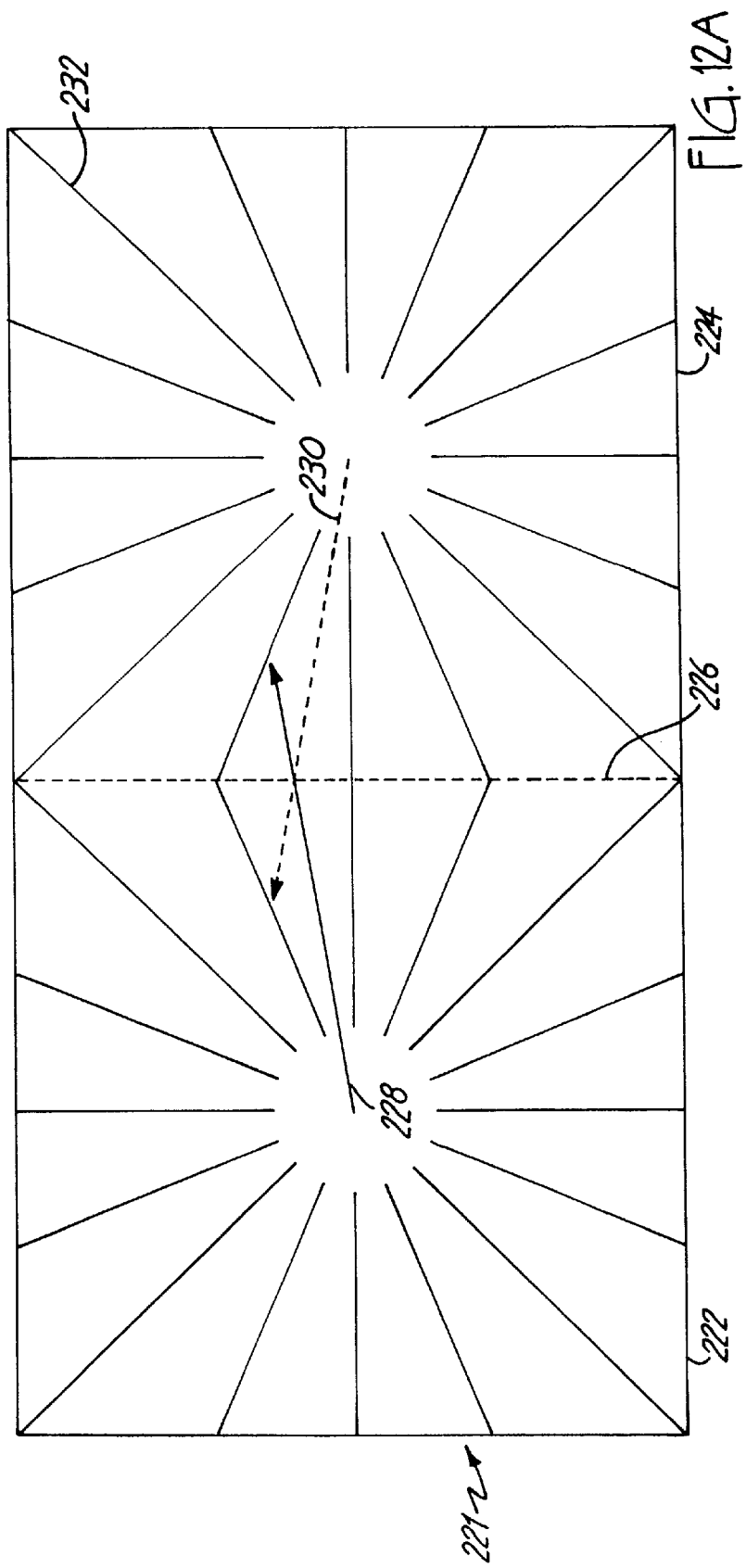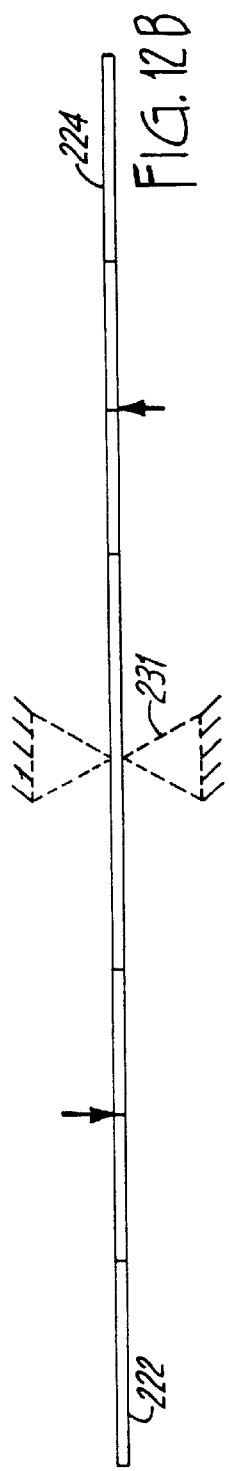

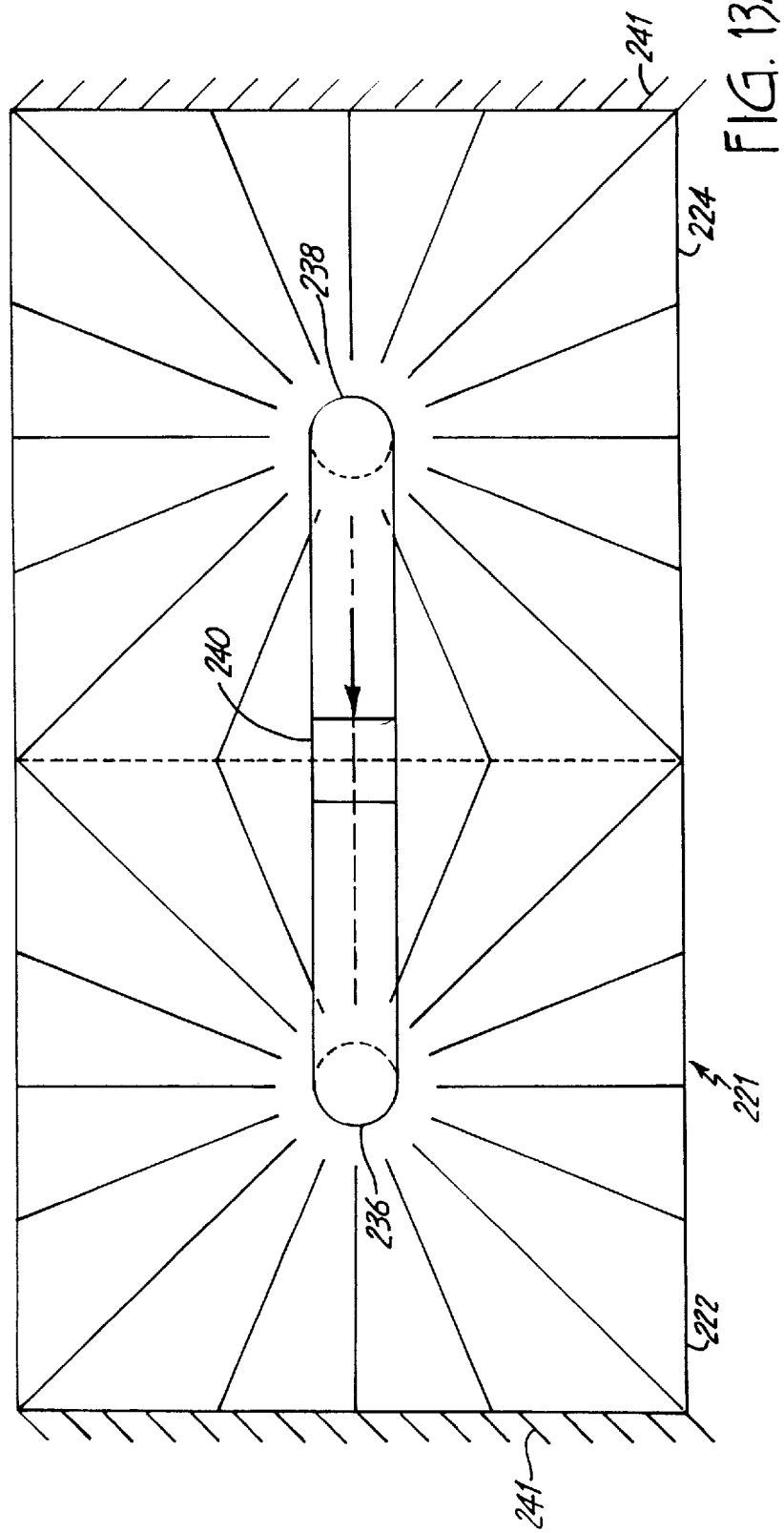
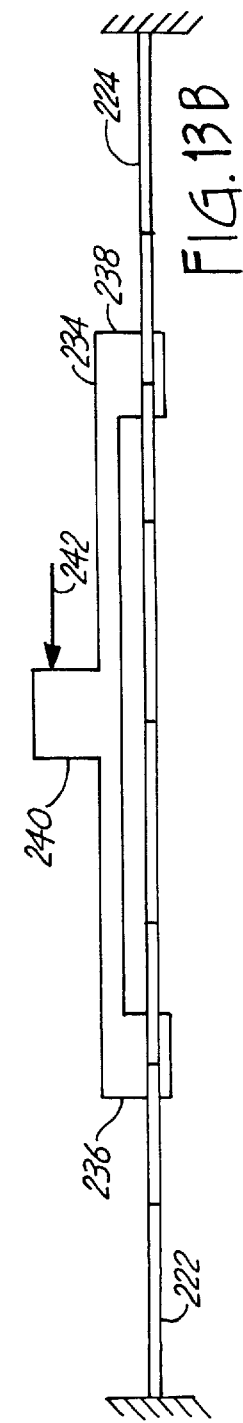
FIG. 13A
FIG. 13B

MECHANICAL ENERGY ABSORBER

CROSS REFERENCE TO RELATED INVENTIONS

This application claims the benefit under Title 35, United States Code 119(e) of the U.S. provisional application No. 60/039,526 filed Mar. 3, 1997 Such provisional application No. 60/039,526 is hereby incorporated by reference in its entirety into this application.

FIELD OF THE INVENTION

The present invention relates generally to stops or energy absorbers, particularly to mechanical stops or energy absorbers, and specifically to bounceless mechanical stops.

BACKGROUND OF THE INVENTION

The theory for the impact of a sphere against a flat plate of infinite extent was published in Physical Review on Apr. 15, 1941, in an article titled "The Intrinsic Inelasticity of Large Plates." A number of problems occur when a finite-sized flat plate is used to similarly absorb mechanical energy and this invention presents one or more solutions to all of them.

SUMMARY OF THE INVENTION

A feature of the present invention is a flat plate which includes a pair of lateral faces, a perimeter, and a set of slits open at the perimeter and extending radially inwardly toward a center of the plate. The center of the plate generally defines a contact area which is contacted by a moving body or a derivative of a moving body such as a boss, an end of a lever, a fulcrum mechanism, or cam and follower assembly.

The slits of the flat plate interrupt what otherwise would be continuous bands or continuous circles about the contact area. The slits interrupt flexural waves and the slits are positioned to reflect the flexural waves again and again in a direction away from the contact area. In other words, the slits provide a tortuous path for the return of flexural waves to their source, the contact area, where such a return generates flexing at the contact area and thus an undesired attendant throwing of the moving body (which is perceived as a bounce).

By maximizing the number of reflections of the flexural waves away from the contact area, the flexural energy is dissipated to a maximum. Such flexural energy is dissipated by internal friction in the plate material. Hence, the greater number of such reflections, the greater the amount of internal friction, the more flexural energy that is dissipated, and the less amount of return reflections to generate the undesirable flexing at the contact area.

In this device, mechanical energy is made to produce lateral motions of a flexible flat plate. For sufficiently thin plate materials and sufficiently high lateral plate velocities, the plate has the characteristic that its lateral velocity in the area of an applied lateral force is proportional to that force. The lateral plate motions are dissipated by internal friction in the plate material.

The flat plate need not see an impact loading in order to absorb mechanical energy; any lateral force applied to the plate is sufficient as long as the force varies appreciably more rapidly than the natural frequency of the plate. For sufficiently slow force variations, the plate would simply act as a spring, giving a lateral deflection proportional to the applied force.

The following are preferred features of the present embodiment:

a. A moving solid body, which is to be stopped without appreciable bounce. The body would not necessarily have to be metal, but for demonstration purposes a four-pound sledge hammer was chosen.

b. A spring, which serves to mediate the impact, avoiding infinite forces and accelerations. A linear spring is desirable since it greatly reduces the mathematical complexity of the analysis, but the contact deformation of the materials will act as a nonlinear spring if a spring isn't deliberately introduced. In our device the linear spring is integral with the lever.

c. An essentially flat plate, whose lateral velocity in the area of contact will be proportional to the applied force. Mathematically, this relationship is that of viscous damping. Mechanically, however, this relationship does not require the dissipation of any energy; the kinetic energy of the moving body is merely transformed into potential and kinetic energy of the flat plate material. The impacting body will rebound from the flat plate before an appreciable amount of the energies in the plate can return. If these plate energies are dissipated by internal friction in the plate material before the impacting object returns, there will be no discernible second bounce. The initial bounce can be almost imperceptible and still allow enough energy-dissipation time.

d. Radial slits in the flat plate. These slits prevent excessively large diaphragm stresses in the plate material and also reflect the flexural waves in the plate in such a way that the waves have difficulty returning to the contact area. Normally, a flat plate can only be deflected about half the thickness of the plate before diaphragm stresses become appreciable and the plate no longer has the desirable characteristic that its velocity is proportional to the applied force. The slits interrupt the continuous band of material around a given circular region, greatly reducing the circumferential rigidity. The slits are designed such that no solid circular area of the plate has lateral deflections relative its fictitious border that exceed half the material thickness. A ray of a flexural wave which reflects from a supported edge acts as if it comes from a fictitious contact area outside of the actual plate, but with the opposite polarity; i.e., an upwards-directed impact instead of the actual downwards-directed impact. A reflection at an unsupported edge does not change polarity. The slits, of course, act as unsupported edges. Not only is the energy in the wave delayed from returning to the contact area, but the energy is also dissipated by internal friction in the plate material.

e. A lever, acting between the moving body and the flat plate, is not essential, but can help to optimize the design. In the mathematically simplest case of a massless lever with infinite rigidity, a massless linear spring, and an infinitely rigid pivot for the lever, the lever serves to change the effective mass of the moving body by the lever ratio squared and the velocity of the moving body by the inverse of the lever ratio. The effective energy of the moving body is therefore not changed.

f. A fairly rigid support for the lever pivot, with a known spring rate. A cantilever beam is less preferable because distortions in the base significantly reduce the spring rate and the resultant spring rate is not predictable without resorting to finite element analysis. The shaft support design is unique. There are no moments produced in the base, so there can be no distortions to reduce the spring rate; the dimensions are chosen such that the application of a vertical force will not cause any horizontal deflections; and the spring rate may be given by a simple formula.

g. Straight-line supports for some or all of the sectors of the plate. The straight-line shape of the plate supports facilitates manufacture and gives desirable reflections to the flexural waves set up in the plate.

Advantages of the present invention manifest themselves in endless potential applications. For example, in automatic equipment such as bottling machines, it is desirable to end a stroke without bouncing. While a piece of equipment is bouncing, it is essentially out of control and, unless the assembly is tuned, the next stroke can't begin until the bouncing has stopped.

The device can also act as a virtually bounceless stop for any linear or rotary actuator, such as a solenoid.

As part of a rotary or linear governor, this device will dissipate energy in a predictable, controllable, and repeatable manner. A potential application would be for self-erecting antennas in space. Another would be for spring-driven turntables in microwave ovens.

The device may be used as a shock absorber in applications where fluid-filled shock absorbers would not be acceptable, such as vehicles operating on the moon or on another planet.

A hand-driven winch typically uses a pawl engaging in teeth to prevent high-speed accidental reverse rotation. Sometimes, the reverse rotation is able to kick the pawl out of the teeth and not let it drop down into a tooth. The crank can then spin backwards very rapidly, possibly causing personal injury. Even a small energy-absorbing device would retard the winch in reverse rotation long enough that the pawl would be able to drop in and stop the rotation.

There is presently no good way of providing escape from upper levels of high-rise buildings in case of fire or other disaster. This device could provide an automatic velocity control for an emergency rappelling mechanism. Attached to a suitable rope or cable, the rappelling mechanism is buckled onto a person to allow a safe descent to the ground. The potential energy represented by the weight of the person times its height above ground level would be dissipated with nothing more than a modest increase in the temperature of the flat plate. Alternatively, the energy-dissipating mechanism could be built into a drum assembly which stores the rope and allows the rope to unroll.

BRIEF DESCRIPTION OF THE DRAWINGS

FIG. 3A is a side view of a short plate support engaged between the upper and lower plates of the mechanical energy absorber of FIG. 1A.

FIG. 3B is an end view of the short plate support of FIG. 3A.

FIG. 3C is a side view of a long plate support engaged between the upper and lower plates of the mechanical energy absorber of FIG. 1A.

FIG. 3D is an end view of the long plate support of FIG. 3C.

FIG. 4A is a side view of one shaft support for a shaft for a lever of the mechanical energy absorber of FIG. 1A.

FIG. 4B is a side view of the other shaft support for a shaft for a lever of the mechanical energy absorber of FIG. 1A.

FIG. 4C is a top view of the shaft and a lever for engagement to the shaft supports of FIGS. 4A and 4B.

FIG. 4D is a side view of the shaft and lever for engagement to the shaft supports of FIGS. 4A and 4B.

FIG. 4E is a side view of a boss for receiving an end of the lever of FIGS. 4C and 4D and for engagement to the upper plate of the mechanical energy absorber of FIG. 1A.

FIG. 6A is a side view of a hammer for engagement to the shaft of FIG. 5D.

FIG. 6B is a detail of a head of the hammer of FIG. 6A.

FIG. 8 is a schematic view of energy waves for one triangular sector of the mechanical energy absorber of FIG. 1A where such sector includes a free edge such as where one straight line support has been removed.

FIG. 9 shows a top view of a folded, absorbing plate for an alternate embodiment of the mechanical energy absorber of FIG. 1.

FIG. 12A shows a schematic view of an alternate embodiment of the mechanical energy absorber of FIG. 1A where such alternate embodiment includes a double plate with a virtual supported edge.

FIG. 12B shows a schematic end view of the alternate embodiment of FIG. 12A.

FIG. 13A shows a schematic view of an alternate embodiment of the mechanical energy absorber of FIG. 1A where such alternate embodiment includes a mechanism for turning impact.

FIG. 13B shows a schematic side view of the alternate embodiment of FIG. 13A.

DESCRIPTION OF THE PREFERRED EMBODIMENTS

Figure 1A:
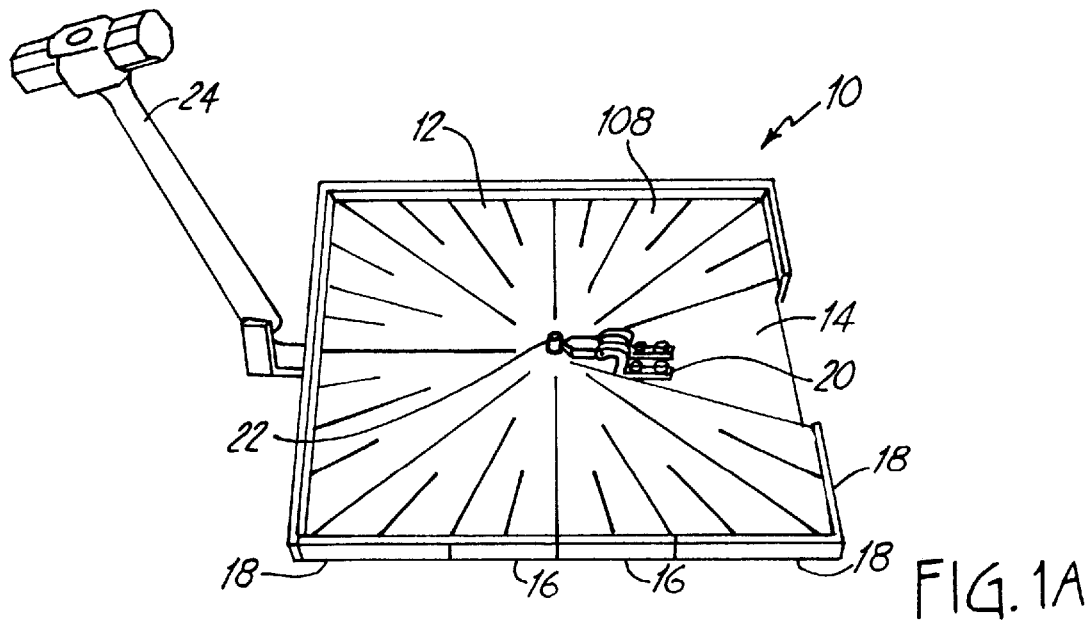
FIG. 1A is a perspective view of the mechanical energy absorber of the present invention.

The mechanical energy absorber of the present invention is indicated in general in FIG. 1A by the reference numeral 10. Mechanical energy absorber 10 generally includes an upper absorbing plate 12, a lower base plate 14, a short plate wall support 16, a long plate wall support 18, a lever mechanism 20 (a derivative of a moving body), a boss 22 (a derivative of a moving body), and a hammer mechanism 24 (a moving body). Boss 22 is affixed to a contact area of upper absorbing plate 12.

Figure 1B:
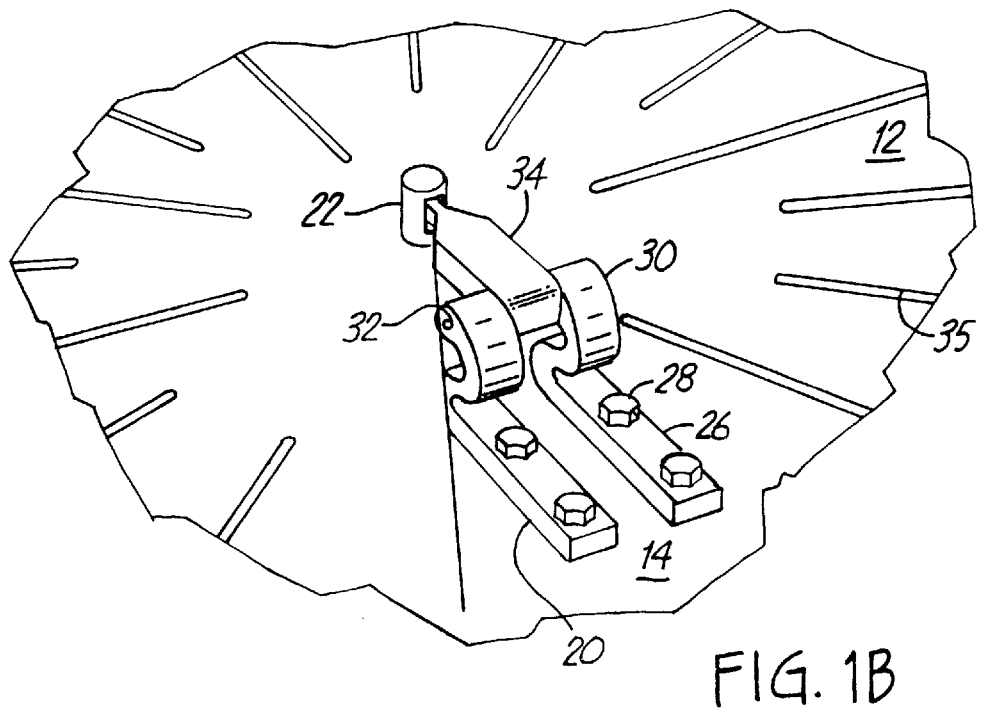
FIG. 1B is a detail of the mechanical energy absorber of FIG. 1A.

FIG. 1B shows lever mechanism 20 and boss 22 in greater detail. Lever mechanism 20 includes a pair of shaft supports 26 engaged via pin connectors 28, which can be screws or bolts, to base plate 14. Each of the shaft supports 26 includes an undulating apertured end or integral spring 30. A shaft 32 is rotatably engaged in and between apertures of undulating ends 30. A lever 34 is rotatably engaged on shaft 32 between undulating ends 30. Lever 34 includes an end freely engaged in a through hole of boss 22. Boss 22 is threadingly engaged with upper absorbing plate 12.

Figure 2A:
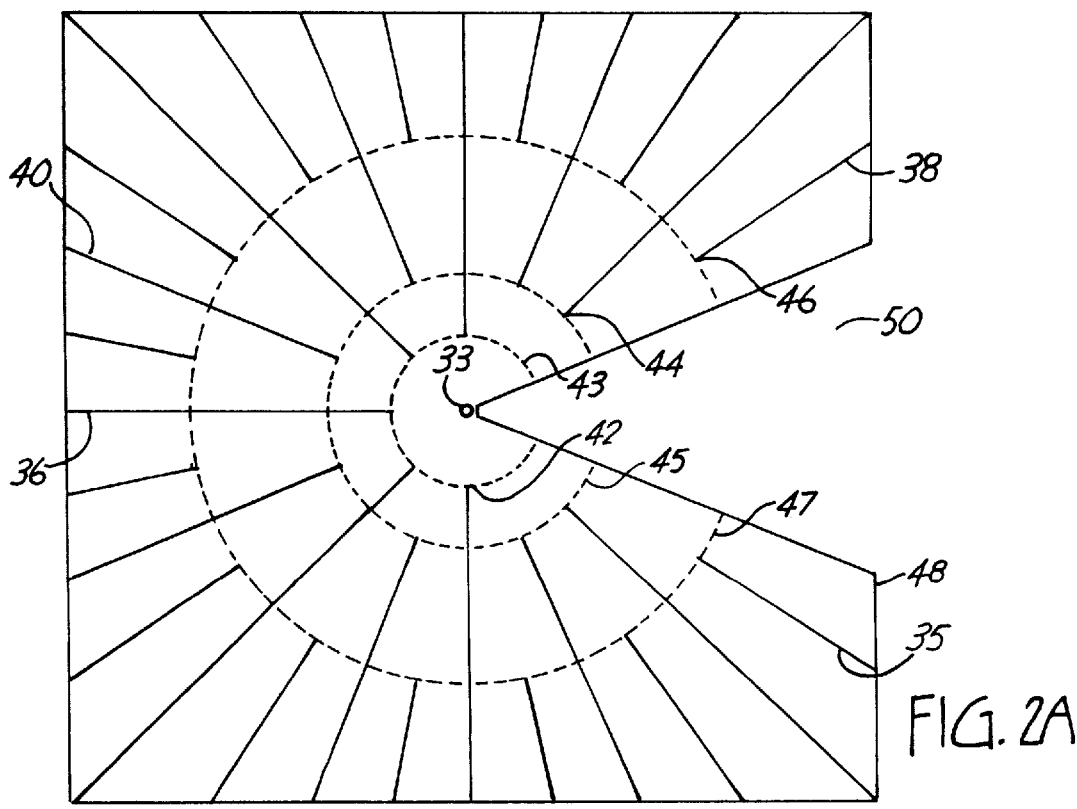
FIG. 2A is a top view of an upper absorbing plate of the mechanical energy absorber of FIG. 1A.

FIG. 2A shows a top view of upper absorbing plate 12. Plate 12 includes a threaded through hole 33 at its center. A nut on the boss holds the boss in place in an unthreaded through hole 33 in the plate 12. Upper plate 12, while integral, further includes a plurality of radial slits 35 extending through upper plate 12, i.e., through upper and lower lateral faces or surfaces of the plate 12, as indicated in FIG. 1B. Slits 35 extend radially relative to hole 33. Slits 35 are of varying lengths and include relatively long slits 36, relatively short slits 38, and medium length slits 40 which have a length less than long slits 36 and greater than short slits 38. The relatively short slits 38 are preferably located on either side of the long slits 36 and on either side of medium length slits 40 to provide for slits 35 of alternating length, a feature which is a result of a desire to interrupt excessively large portions of the plate as the plate spreads outwardly from the contact area. Long slits 36 have ends 42 which terminate an equidistance from center hole 33, as shown by phantom circular line 43. Medium length slits 40 have ends 44 which terminate an equidistance from center hole 33, as shown by phantom circular line 45. Short slits 38 have ends 46 which terminate an equidistance from center hole 33, as shown by phantom circular line 47. Each of slits 36, 40, 38 extend from their respective terminating ends 42, 44, 46 to and through a square perimeter 48 of upper absorbing plate 12. Plate 12 further includes a V-shaped cutout portion 50 to provide a space for mounting lever mechanism 20. Radial slits 36, 38 and 40 are spaced 11.25 degrees apart. Plate 12 preferably includes a thickness of about 0.062 inches and is preferably formed of 1095 steel hardened to Rc 42–46. Plate 12 is preferably flat.

It should be noted that long slits 36 prevent flexural waves from returning immediately to the contact area. Open end of long slit 36 is disposed at a portion of the perimeter 48 of the plate 12 where such portion is tangential to a fictitious circle having the contact area 33 as its center. Without slit 36, a flexural waves reflects at a 90 degree angle at said portion of the perimeter 48 to reflect directly back to the contact area. With slit 36, flexural waves are introduced at less than 90 degrees and thus reflect back at less than 90 degrees, thereby increasing the chance that such flexural waves are not reflected back to the contact area but instead reflect such as to a free edge of a triangular sector as described below.

Figure 2B:
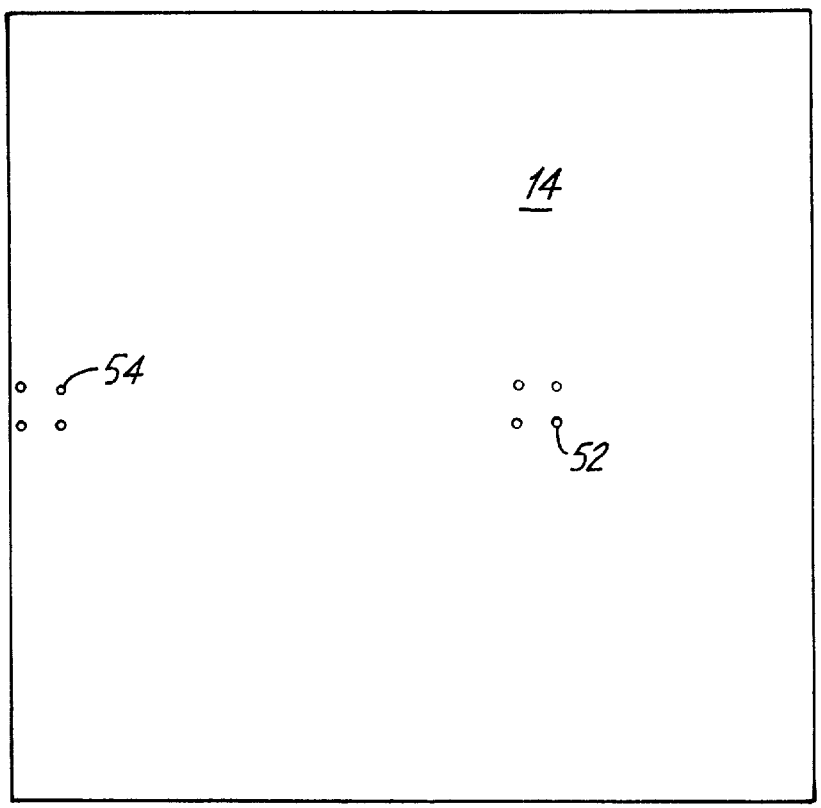
FIG. 2B is a top view of a lower, base plate of the mechanical energy absorber of FIG. 1A.

Base plate 14 is shown in FIG. 2B and includes a set of four threaded holes 52 for mounting shaft supports 26 of lever mechanism 20. Base plate 14 further includes a set of four holes 54 for mounting hammer mechanism 24. Base plate 14 further includes a perimeter edge in which threaded holes are formed for mounting the short plate wall supports 16 and the long plate wall supports 18. Each such threaded hole extends at a right angle relative to its perimeter edge portion. Base plate 14 is preferably formed of steel about one-quarter of an inch in thickness. Each perimeter side of base plate 14 is preferably about or slightly less than 20 inches.

FIGS. 3A–D show short plate wall supports or straight line supports 16 and long plate wall supports or straight line supports 18. Each of the wall supports 16 and 18 includes a pair of holes 56 for registering with the threaded holes formed in the perimeter edge of base plate 14. Pin connectors engage the wall supports 16 and 18 with base plate 14. Each of the wall supports 16 and 18 further includes a slot 58 extending in from an inner surface 60 of the wall supports 16 and 18. Slots 58 freely engage the perimeter edge 48 of upper absorbing plate 12. Long plate wall supports 18 engage the corners of the upper absorbing plate 12 and a pair of abutting short plate wall supports 16 is disposed on the same perimeter edge and between two of the corner long plate wall supports 18. Long slits 36 register with the intersection formed by corner long plate wall supports 18 and with the intersection of two abutting short plate wall supports 16. Medium length slits 40 register with the intersection formed by one long plate wall support 18 and one short plate wall support 16. Short slits 38 are the only slits which do not register with any such intersection. Wall supports 16 and 18 are preferably formed of brass which is half hard. Wall supports are preferably about one-quarter of an inch in thickness.

FIGS. 4A–4E show detail views of features of lever mechanism 20. As shown in FIGS. 4A and 4B, shaft supports 26 include through holes 62 for pin connectors 28. Each undulating end or spring 30 includes a through aperture 64 for lever shaft 32 and a pair of tapering portions 65. FIGS. 4C and 4D show a through hole 66 for lever shaft 32 and further show a main lever body portion 68, a tapering lever body portion 70 and a boss receiving end 72 of the lever 34. As shown in FIG. 4D, boss receiving end 72 is disk like in shape so as to minimize contact between the boss 22 and the lever 34 when the lever 22 is struck by hammer mechanism 24. FIG. 4E shows cylindrical boss 22 which includes a threaded end 74 for engaging center hole 33 of upper absorbing plate 12 and a through hole 76 for receiving end 72 of lever 34. Lever 34 is preferably formed of an annealed steel heat treated to Rc 52–56 after being machined. Shaft supports 26 are preferably formed of steel, hardened to Rc 52–56. Lever shaft 32 is preferably a steel reamer blank.

Figure 5A:
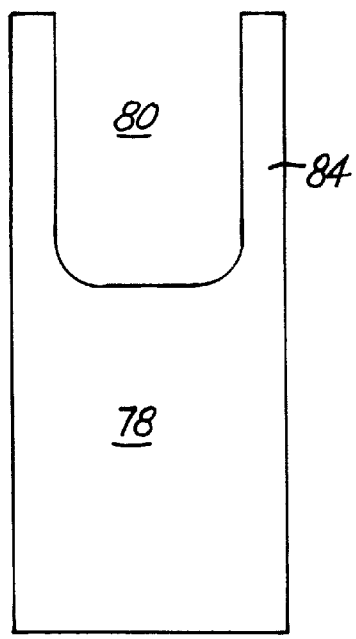
FIG. 5A is a side view of a standoff for the hammer of the mechanical energy absorber of FIG. 1A.
Figure 5B:
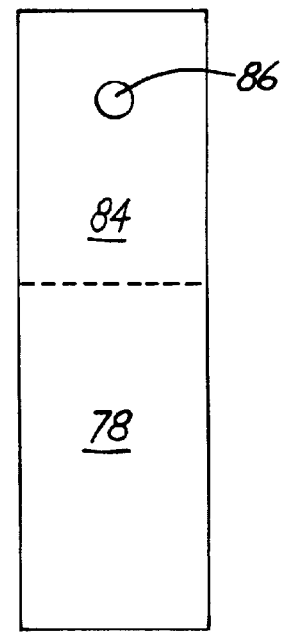
FIG. 5B is an end view of the standoff of FIG. 5A.
Figure 5C:
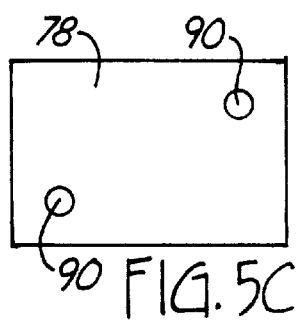
FIG. 5C is a bottom view of the standoff of FIG. 5A.
Figure 5D:
FIG. 5D is a side view of a shaft for engagement between the standoff of FIG. 5A and a hammer of the mechanical energy absorber of FIG. 1A.
Figure 5E:
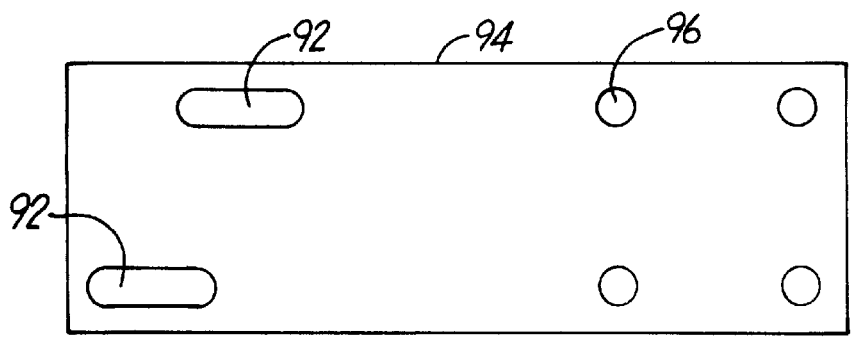
FIG. 5E is a top view of a hammer support for engagement between the standoff of FIG. 5A and the lower plate of the mechanical energy absorber of FIG. 1A.

FIGS. 5A–E and FIGS. 6A and 6B show features of hammer mechanism 24. FIGS. 5A and 5B show a standoff 78 with a receiver 80 for a hammer handle 82 of a hammer 83, shown in FIG. 6A. Upper side ends 84 of the standoff 78 include a through hole 86 for receiving a hammer shaft 88, shown in FIG. 5D. Threaded bored holes 90 are formed in a bottom portion of standoff 78 for registering along adjustment slots 92 formed in a hammer support 94, shown in FIG. 5E. Hammer support 94 further includes a set of four holes 96 for registering with the set of four holes 54 formed in base plate 14. Hammer shaft 88 is cylindrical and includes annular slots 98 for receiving C-clamp type or snap ring type washers to minimize axial movement of hammer shaft 88. A second set of such annular slots may be formed in hammer shaft 88 to minimize such axial movement of hammer handle 82. Shaft 88 extends through hole 100 of hammer handle 82. Hammer mechanism 24 further includes a head 102 for the hammer 83. Hammer head 102 includes a disk like edge 104 for striking the lever so as to minimize surface contact therebetween. Hammer support 94 and hammer standoff 78 are preferably formed of steel. Hammer shaft 88 is preferably formed of a drill rod steel. Boss 22 is preferably formed of brass. It should be noted that the proper distance between the hammer mechanism 24 and lever mechanism 20, i.e., between disk like edge 104 and lever 68, may be selected by registering holes 90 in the bottom portion of standoff 78 at some point in the slots 92 formed in the hammer support 94.

Figure 7:
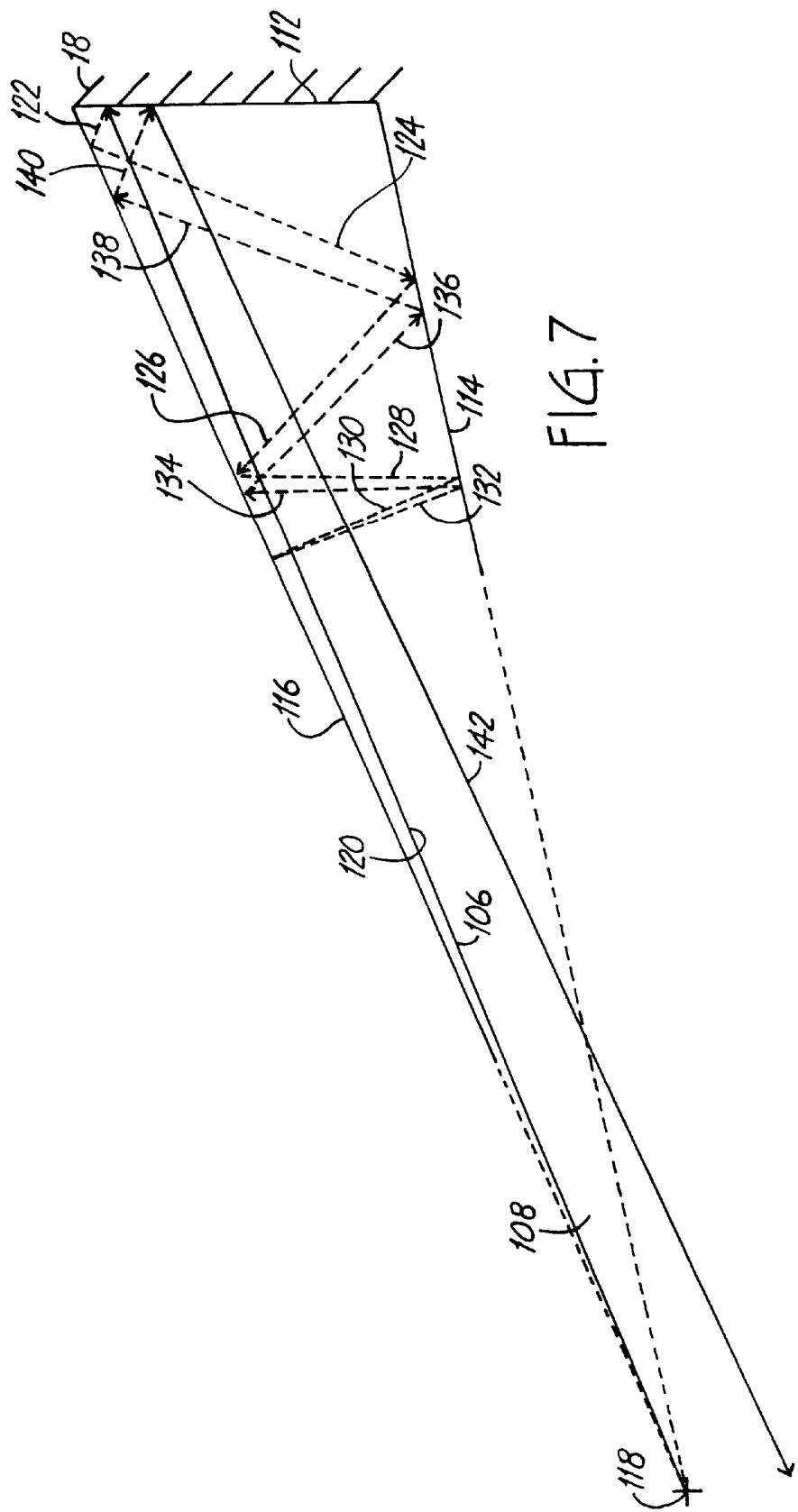
FIG. 7 is a schematic view of energy waves for one triangular sector of the mechanical energy absorber of FIG. 1A where such sector includes a supported edge.

The complex and lengthy path of a ray 106 in one sector 108 of plate 12 is shown in FIG. 7 for a supported edge 112 of plate 12 supported by long plate wall support 18 and in FIG. 8 for a free edge 146 in an embodiment such as where long plate wall support 18 is absent. Sector 108 includes supported edge 112, free edge 114 formed by short slit 38 and a free edge 116 formed by medium length slit 40. Sector 108, like each of the other sectors of plate 12, is triangular in shape. Such a triangular shape delays a flexural wave from returning to a contact area 118 adjacent boss 22. For example, ray 106 includes a first portion 120 traveling from the contact area 118 to supported edge 112, a second portion 122 of reversed polarity traveling from supported edge 112 to free edge 116, a third portion 124 traveling from free edge 116 to free edge 114, a fourth portion 126 traveling from free edge 114 back to free edge 116, a fifth portion 128 traveling from free edge 116 again back to free edge 114, a sixth portion 130 traveling from free edge 114 yet again back to free edge 116, a seventh portion 132 traveling from free edge 116 still again back to free edge 114 and being directed generally back in the direction of supported edge 112, an eighth portion 134 traveling from free edge 114 to free edge 116, a ninth portion 136 traveling from free edge 116 back to free edge 114, a tenth portion 138 traveling from free edge 114 to free edge 116, an eleventh portion 140 traveling from free edge 116 to supported edge 112, and an twelfth portion 142 with original polarity traveling from supported edge 112 back to an area adjacent to the contact area 118. The ray reflects from the free edge 114 or 116 or supported edge 112 at the same angle as it came in to such edge.

Ray 106 of a flexural wave which reflects from supported edge 112 acts as if it comes from a fictitious contact area outside of the actual plate 12, but with the opposite polarity; i.e., an upwards-directed impact instead of the actual downwards-directed impact A reflection at an unsupported edge does not change polarity. The slits 36, 38, and 40, of course, act as unsupported edges. Not only is the energy in the wave delayed from returning to the contact area 118, but the energy is also dissipated by internal friction in the plate material.

FIG. 8 shows a plate sector 144 of a plate similar to plate 12 except that the plate having sector 144 includes no supported edge, i.e. no long plate wall supports 18 and no short plate wall supports 16. Instead, plate sector 144 includes an outer free edge 146 as well as free edges 114 and 116. In such a plate sector 144, as shown in FIG. 8, the reflection of a ray 148 takes the same path as shown in FIG. 7 except there is no change in polarity.

FIG. 9 shows folded plate 150, an alternate embodiment of mechanical absorber 10. Most of the weight of plate 12 is due to base 14 and the plate supports 16 and 18. This weight is greatly reduced by wrapping flat plate 150 back on itself, as indicated by the phantom lines in FIG. 9. The dimensions of this alternative plate 150 were chosen to essentially maintain the same weights between plates 12 and 150, although the weight of plate 150 may be significantly further reduced and still have a relative bounce height of less than 1%. The present embodiment having plate 12 weighs 45.8 pounds and this alternate embodiment having plate 150 may weigh about 13 pounds. If desired, the size of plate 150 may be significantly reduced.

Further as to FIG. 9, plate 150 includes integral wall sections 152 defined by the phantom lines 154 and 156, folded under shock absorbing plate portions 158 which may be affixed to a base or other support, and an upper shock absorbing plate portion 160 having sectors 162 defined by radial slits 164. Upper plate portion 160 includes a contact area 166. As with slits 35 of plate 12, slits 164 are of varying lengths. It should be noted that some slits 164 extend through one of the wall sections 152 and into one of the folded under shock absorbing base portions 158. In other words, a slit portion 168 in upper plate portion 160 communicates with a slit portion 170 in wall section 152 which in turn communicates with a slit portion 172 in folded under base portion 158. When base portion 158 is folded under, slit portions 172 are parallel with their respective slit portions 168 in upper plate portion 160. When folded under, it is preferred that base plate portion 158 is parallel with upper plate portion 160, though such is not required.

Further as to FIG. 9, it should be noted that upper plate portion 160 includes sectors 162 which are triangular in shape. The sides of each of the sectors are generally defined by radial lines running outward from the center of plate portion 160 where such radial lines are also generally defined by the radial slits. The third side of each of the sectors is defined by phantom line 154 where the plate 150 is folded to form wall sections 152. Further, base plate portions 158 include sectors which are generally triangular in shape and are defined by folded line 156 and radial lines defined by the slit portions 172.

Figure 10A:
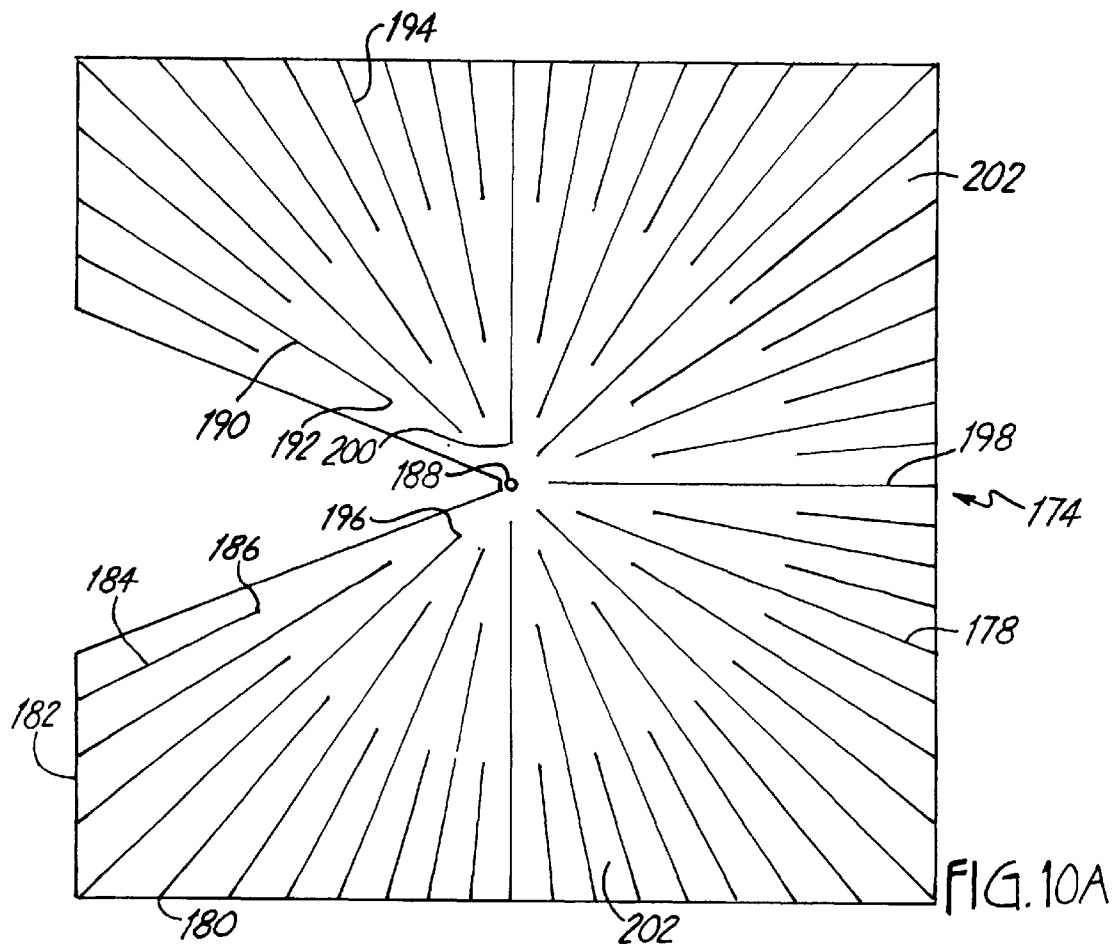
FIG. 10A shows a top view of a laminated, absorbing plate for an alternate embodiment the mechanical energy absorber of FIG. 1.
Figure 10B:
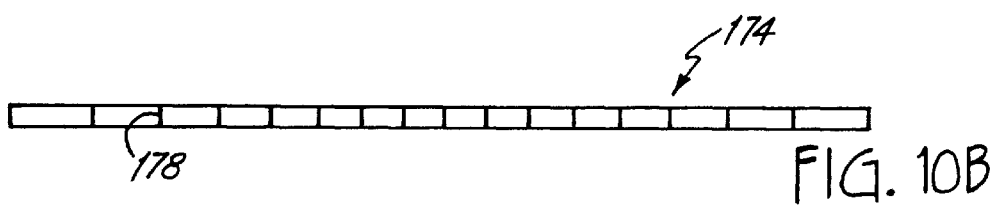
FIG. 10B shows a side view of the laminated, absorbing plate of FIG. 10A.
Figure 10C:
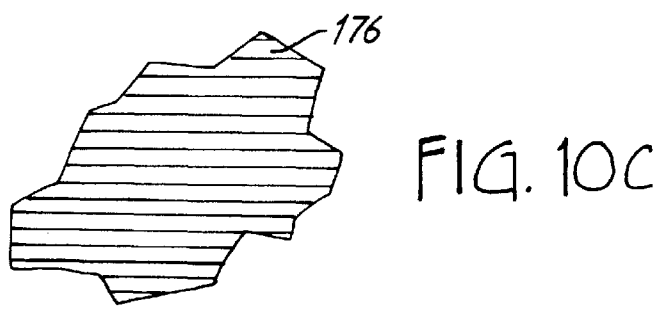
FIG. 10C shows a detail partial side view of the laminated, absorbing plate of FIG. 10A.

FIG. 10A shows a laminated mechanical energy absorbing plate 174 formed of a plurality of individual layers 176, as shown in FIG. 10C. One preferred embodiment of the laminated plate 174 includes sixteen layers of steel, with each layer being one-half the size of plate 12 (i.e. having one-fourth the surface area), and with each layer being one-fourth the thickness of plate 12. Thus, the weight of the plate 174 is equal to or about equal to the weight of plate 12, but the weight of any wall supports for plate 174 is reduced since laminated plate 174 includes a smaller perimeter and the weight of any base is reduced since laminated plate 174 is half the size of plate 12. The steel layers 176 may be laminated with a solid or non solid lubricant. It should be noted that slits 178 formed in laminated plate 174 are greater in number than found in plate 12. Each of the slits 178 includes an outer terminating end 180 terminating at a perimeter 182 of plate 174. Slits 178 include one set of slits 184 having inner terminating ends 186 which terminate an equidistance from a contact area 188. Slits 178 further include a second set of slits 190 having inner terminating ends 192 which terminate an equidistance from contact area 188. Slits 178 further include a third set of slits 194 having inner terminating ends 196 which terminate an equidistance from contact area 188. Slits 178 still further include a fourth set of slits 198 having inner terminating ends 200 which terminate an equidistance from contact area 188.

The slits 178 of plate 174 define triangular sectors 202. The sides of each of the sectors 202 are generally defined by radial lines extending from contact area 188 where such radial lines generally register with the slits 178. The third side of each of the triangular sectors 202 is defined by the perimeter 182. The slits 178 are greater in number than in plate 174 because of the smaller size of plate 174 so as to properly control the diaphragm stresses in plate 174.

Figure 11A:
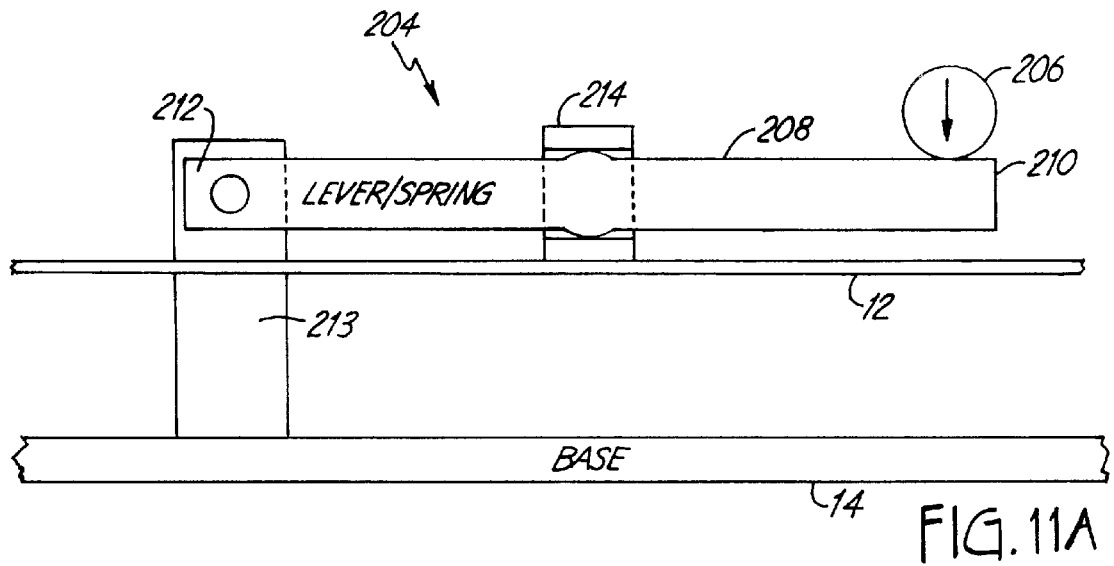
FIG. 11A shows a schematic view of an alternate embodiment of the mechanical energy absorber of FIG. 1A where such alternate embodiment has the mechanical advantage of two.

A lever mechanism 204 having a mechanical advantage greater than one is shown in FIG. 11A. Such a lever mechanism 204 is for an application where an impacting object 206 has a relatively low mass and a high velocity. The lever mechanism 204 includes a lever 208 having an impacted end 210 and a fixed pivoting end 212 which is fixed to a base such as base 14 through upright support 213. A fulcrum mechanism 214 for lever 208 is fixed to a contact area of a mechanical shock absorbing plate such as plate 12, 150, or 174. Hammer mechanism 24 is an impacting object which is relatively massive and slow-moving, and hence the mechanical advantage of lever mechanism 20 is chosen to be less than one.

Figure 11B:
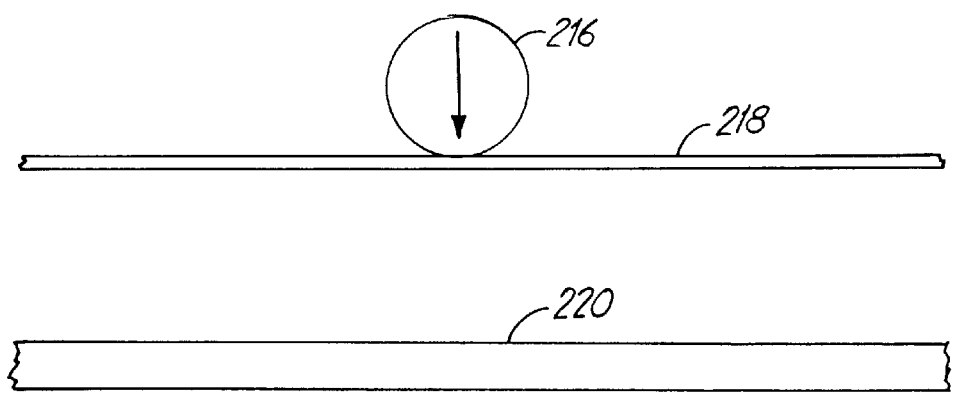
FIG. 11B shows a schematic view of an alternate embodiment of the mechanical energy absorber of FIG. 1A where such alternate embodiment is directly impacted such as with a steel ball.

It should be noted that, as shown in FIG. 11B, neither a lever such as lever 34 nor a spring such as undulating end or spring 30 is required. Nor is the lever mechanism 20 as a whole required. Instead, the relatively simple design indicated in FIG. 11B may be used, which includes an impacting object 216, a mechanical energy absorbing plate 218 such as plate 12, 150, or 174, and a base 220 such as base plate 14 or shock absorbing plate portions 158.

An advantageous mechanical energy absorbing plate 221 is shown in FIGS. 12A and 12B. Basically, plate 221 includes two square plates portions 222, 224 which are joined along a common integral side 226, and equal and opposite impacts are delivered to the center of each of the plate portions 222, 224. Flexural waves 228, 230 are not reflected from the common edge 226, but each continues on into the other plate portion. The waves 228, 230 are, however, equal and opposite so the net effect is the same as having each wave reflected from the common edge 226 as if it were a supported edge. The common edge 226 then acts as if it were supported (such as by a virtual support 231 shown in FIG. 12B) and each of the plate portions 222, 224 acts as if the other plate portion was absent. It should be noted that each of the plate portions 222, 224 may have slits 232 as shown or may have the slit arrangement of one of the plates 12, 150 or 174. Plate 221 may be supported by wall supports such as supports 16, 18 and may include a base plate such as base plate 14.

The rectangular shape for plate 221 shown in FIG. 12A may be advantageous in itself for some applications, but the concept of the present invention also allows a fairly simple way to turn the impact so the plane of plate 221 can be parallel to the direction of the original impact. As shown in FIGS. 13A and 13B, a structure 234 between the impact and plate 221 acts both as a pair of levers and as a pair of springs, delivering equal and opposite impacts to the two halves of plate 221, i.e. to each of the plate portions 222, 224. In the interests of clarity, the impact is simply shown as an arrow. Structure 234 includes a boss like end 236 fixed to the center of plate portion 222 and a boss like end 238 fixed to the center of plate portion 224. Plate 221 further includes an extension 240 for bearing the brunt of the impact, indicated by reference arrow 242. Extension 240 extends in the opposite direction of boss like ends 236 and 238 and is preferably disposed midway between the boss like ends 236 and 238. Reference number 241 indicates schematically straight line supports for plate 221, such as straight line supports 16, 18.

Figure 14:
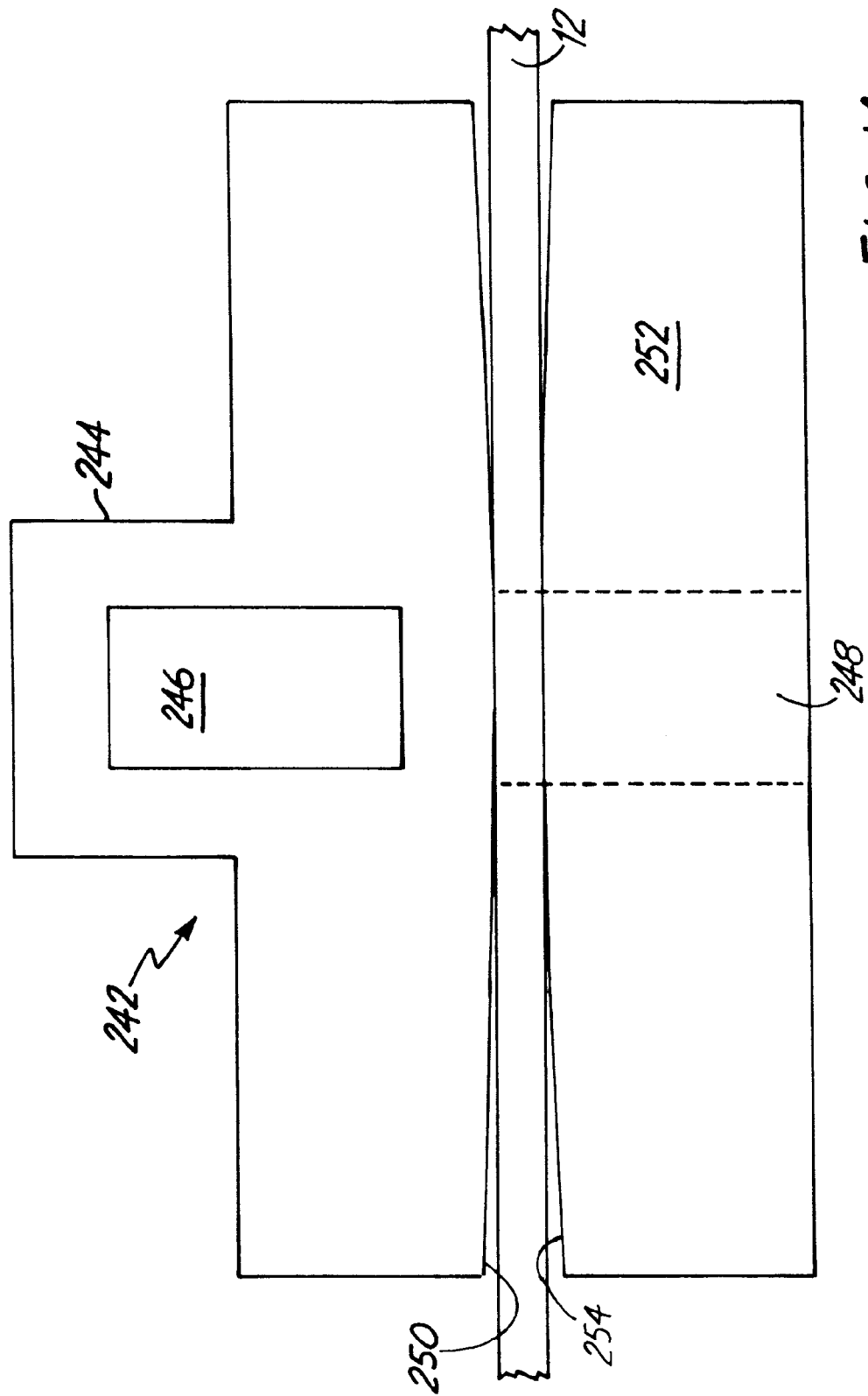
FIG. 14 shows a side view of an alternate embodiment of the boss shown in FIG. 4E.

It is preferred that stresses be minimized in plate material near the center of the mechanical energy absorbing plates such as plates 12, 150 and 174. The calculated stresses there are not beyond the expected strength of the material, but for commercial usage the stresses preferably do not exceed the fatigue endurance limit of the material. One way to minimize material stresses near the center of the plates such as plates 12, 150 and 174 is to control the minimum radius of curvature by shaping the component which delivers the energy to the plate, i.e. a boss such as boss 242 shown in FIG. 14. This is a modification of boss 22 shown in FIGS. 1 and 4E. The diameter of the modified boss 242 is preferably greater than the expected largest diameter of contact between the boss 242 and the mechanical energy absorbing plate. Boss 242 includes a first portion 244 having a through hole 246 for reception of an end of a lever, such as end 72 of lever 34. First portion 244 further includes an integral threaded male pin connector 248 and a convex edge 250 for minimally abutting one of the faces of a mechanical energy absorbing plate such as plate 12, 150, or 174. Pin connector 248 extends from the center of convex edge 250. Boss 242 further includes an apertured second portion or female receptor 252 for threaded engagement with pin connector 248. Second portion 252 includes a convex edge 254 for minimally abutting the other of the faces of the mechanical energy absorbing plate.

Alternate Embodiments as General Absorbers of Mechanical Energy

Any form of mechanical energy can be suitably transformed so as to be able to be dissipated by this device. The application as a virtually bounceless mechanical stop is in many ways the most difficult to achieve. For one thing, the initial energy input to the plate travels as a higher-velocity flexural wave than does energy input later. Some of this effect is no doubt due merely to mathematical simplifications introduced in order to make the analysis of flexural waves in plates possible, but studies have indicated the anomalously-high initial velocities are real. Also, the analysis involves the mass of the impacting object and the characteristics of the spring, which are not involved when the device is used to just absorb mechanical energy.

There are two conditions for making this device effectively dissipate mechanical energy more or less continuously. The velocity of the plate in the contact area will be varied with a frequency appreciably greater than the natural frequency of the plate. Also, the plate will be able to dissipate energy rapidly enough that a significant fraction of any packet of energy which is input is dissipated before it can return to the contact area.

If the driving frequency is on the order of the plate's natural frequency, or less, the device will essentially act as a linear spring with the deflection of the plate near the contact area proportional to the applied force. But, if driven at a significantly higher frequency, the velocity of the plate near the contact area will be proportional to the applied force. This is the desired characteristic for a damping device, the ratio of the applied force to the plate velocity being taken as the damping constant. This damping constant can be easily calculated for a plate of infinite extent.

For a plate of finite extent, some portion of any energy input to the plate will eventually be reflected back to the contact area. The net result of this returning energy is to reduce the damping constant from that of an infinite plate. So long as most of the input energy can be dissipated in the plate before it can return to the contact area, the damping constant will be nearly equal to that for an infinite plate.

Radial slits in the plate delay the return of the input energy, so are advantageous. The extra energy in the outer portions of the plate increases the stresses in the plate material there, greatly increasing the rate of energy dissipation.

Another way to enhance the energy dissipation rate is to increase the internal friction of the plate material. Internal friction in solid materials is due to a great number of causes, many of which are not well understood and can't easily be controlled. One source of internal friction which is well understood and can be easily controlled is that due to thermal effects in the material. It is well known that temperature changes in a solid material cause dimensional changes, but it is less well known that the inverse is also true. When flexural waves are set up in a thin solid material, one side of the material is stretched while the other side is compressed. These dimensional changes cause temperature changes at those locations. If the frequency of the flexural wave is very low, heat transfer in the material will be able to keep these temperature differences from developing to any significant extent and no appreciable energy will be dissipated. If the frequency of the flexural wave is very high, there will not be time for any appreciable heat transfer to take place and again no appreciable energy will be dissipated. For some intermediate frequency range, these thermal effects will dissipate significantly more energy than all the other sources of internal friction operating at that frequency. By properly choosing the material thickness and the operating frequency for a given material, the rate of energy dissipation in the plate material can be greatly enhanced. A laminated plate may be used to match the optimum material thickness with the plate mass, the plate size, and the damping constant.

Figure 15A:
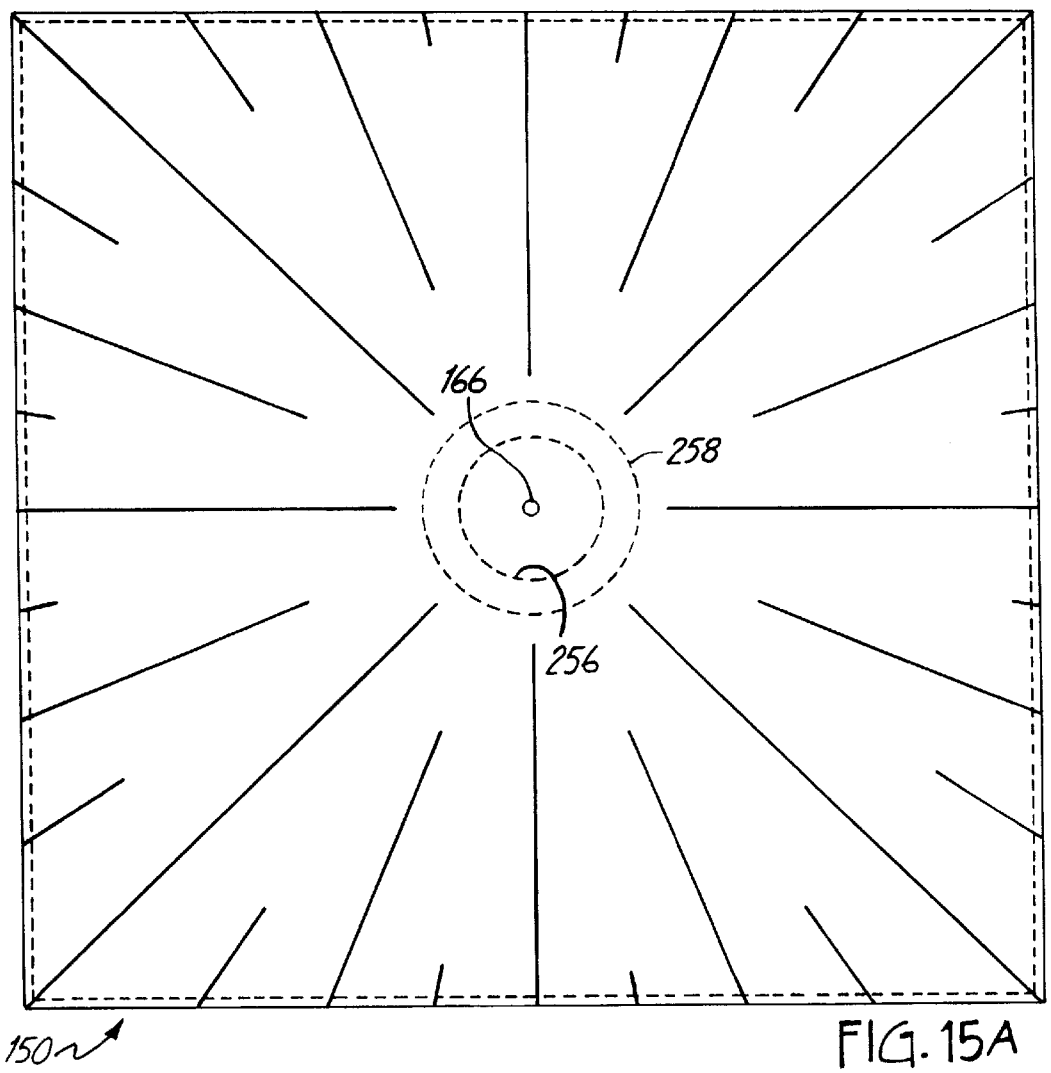
FIG. 15A shows an alternate embodiment as a general absorber of mechanical energy.

A simple embodiment of this device for dissipating mechanical energy is shown in FIG. 15A, where a push-pull mechanical motion is applied to folded plate 150 with radial slits 164. Folded plate 150 includes, as shown in FIG. 9, distal edges 256 on the folded plate portion 158. When plate portion 158 is folded, distal edges 256 effectively form a circular shape, as shown by the phantom line designated 256 in FIG. 15A. These distal edges 256 are fixed in or to a disk like base 258, shown in FIG. 15B, where such fixing is in the manner of straight line supports 16 and 18 except that the slot in base 258 is circular.

Figure 15B:
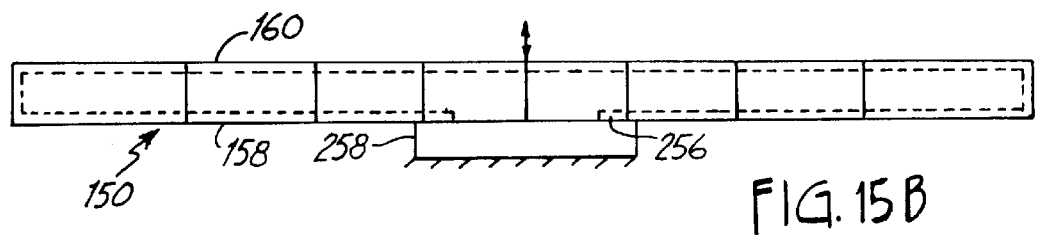
FIG. 15B shows a side or end view of the embodiment of FIG. 15A.
Figure 16:
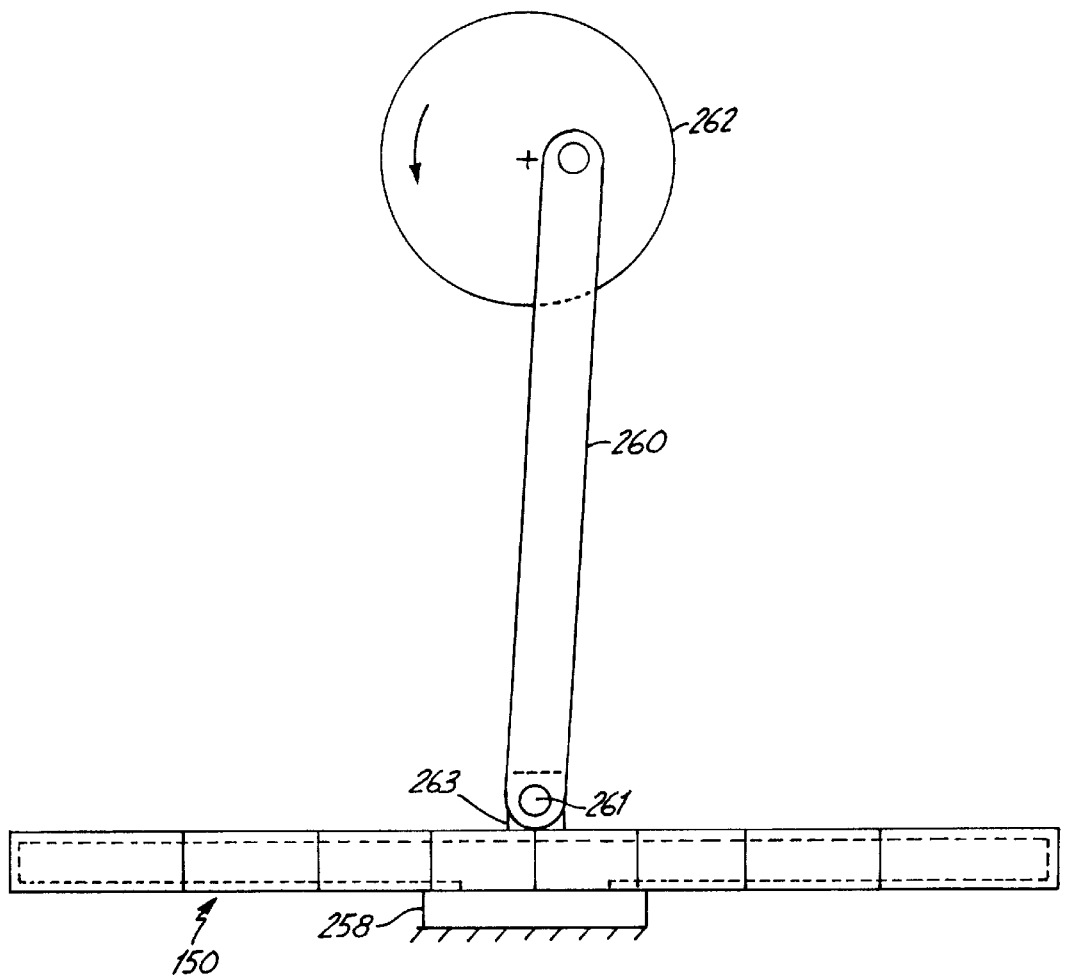
FIG. 16 shows a schematic view of an alternate embodiment of the mechanical energy absorber of FIG. 1A where such alternate embodiment includes an energy absorber which interacts with a motion conversion mechanism.

As shown schematically in FIG. 15B, the folded plate 150 is preferably not applicable to a constant motion. There are, however, many ways to convert a more or less constant rotary or linear motion to a more or less sinusoidal linear motion, so the device actually has a very wide applicability. All of the embodiments indicated for the virtually bounceless mechanical stop can then be utilized for the general absorbers of mechanical energy. Some additional embodiments for the latter application will also be discussed. Perhaps the simplest way to convert a rotary motion to an oscillating linear motion is with a rod 260 attached to an rotating object 262, as shown in FIG. 16. The rod 260 couples the rotating object 262 to the plate of the energy-dissipating device 150. Rod is coupled to plate 150 via a pivot pin 261 between the rod 260 and a boss 263. Gears can be used, if necessary, to drive the plate at an optimum frequency.

Figure 17:
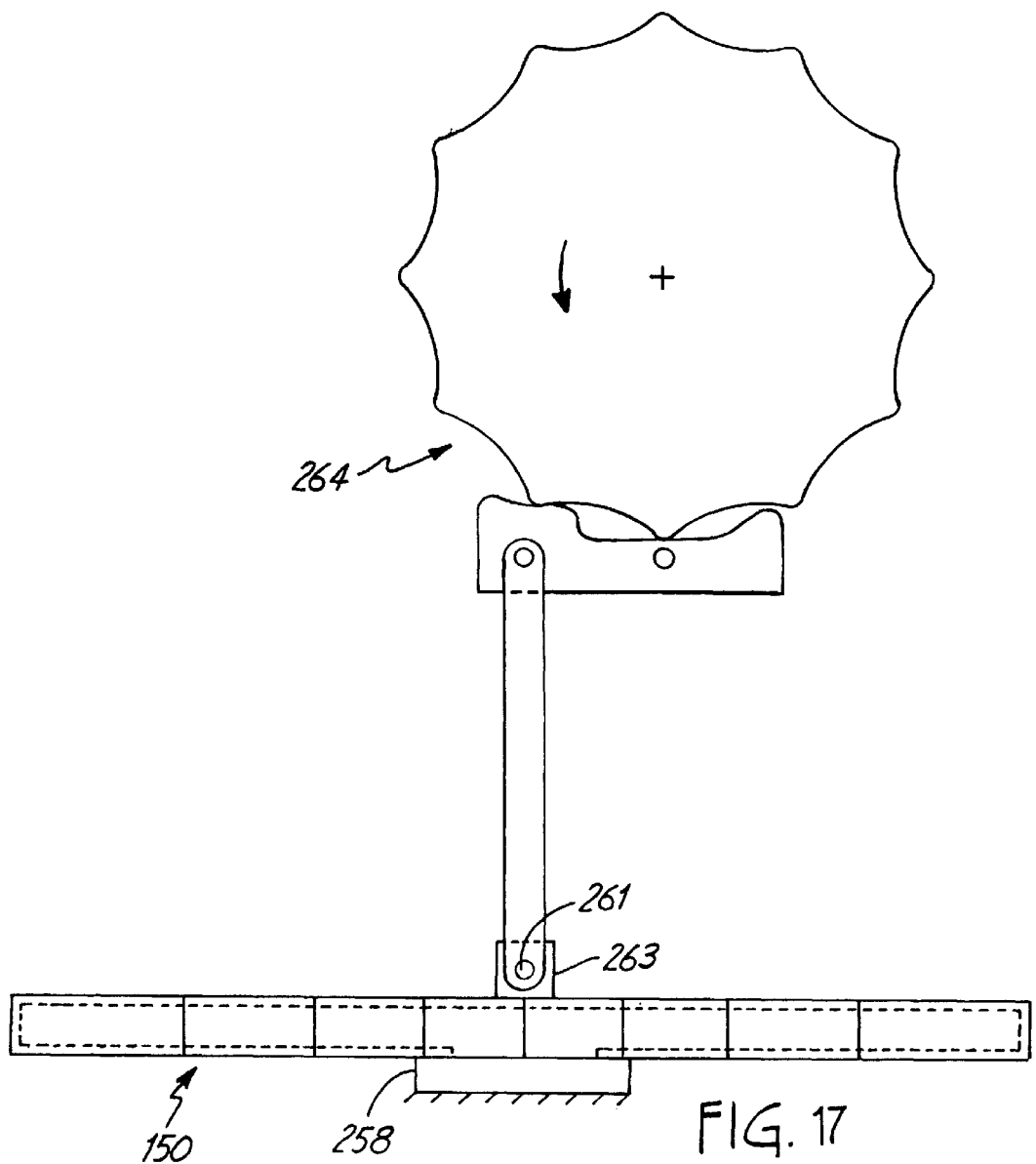
FIG. 17 shows a schematic view of an alternate embodiment of the mechanical energy absorber of FIG. 1A where such alternate embodiment includes an energy absorber which interacts with a motion conversion mechanism.

A rotary motion can also produce an oscillating linear motion with a cam and follower assembly 264, as shown in FIG. 17. With an intermediate rack and gear, this assembly will also convert a linear motion to an oscillating linear motion. Again, gears can be used to drive the plate at an optimum frequency.

Plates 12, 150, 174 and 221 are preferably formed from materials such as metal, wood, and plastics. Metals are most preferred. Of the metals, steel is most preferred.

EXAMPLE

The apparatus of FIG. 1 was used to determine a relative bounce height. Hammer mechanism 24 included a 4 pound sledge hammer. Plate 12 was 0.062 inch thick 1095 steel, hardened to Rc 42–46. Plate 12 measured 20.000 inches by 20.000 inches. Radial slits 35 were placed 11.25 degrees apart. Fourteen relatively short slits 38 were formed to terminate 6.750 inches from the contact area 33. Eight medium length slits 40 were formed to terminate 3.375 inches from the contact area 33. Five relatively long slits 36 were formed to terminate 1.870 inches from contact area 33. Cutout 50 had a span of 45 degrees. Base plate 14 was steel and was 0.250 inches thick. Plate supports 16 and 18 were formed of brass, half hard, 0.25 inches thick. Lever 34 was 5160 steel, annealed, and heat treated to Rc 52–56 after machining. Shaft supports 26 were 5160 steel, hardened to Rc 52–56. After adjusting the location of the initial impact point of the hammer face with the lever 68 of the lever mechanism 20, the relative bounce height was measured. The hammer dropped 12.81 inches and bounced only an average of 0.0383 inches in four tries. This ratio provides the relative bounce height of 0.299%, which is very low.

It should be noted that by definition a mechanical energy absorber includes a mechanical stop.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A mechanical energy absorber for at least one of a moving body and a derivative of a moving body, comprising, in combination:

a) a support; and
   b) a plate engaged to the support and comprising a perimeter and a pair of lateral faces, with one of the lateral faces comprising a contact area for interacting with at least one of the moving body and derivative of the moving body, with the plate further having a plurality of slits open at the perimeter and extending inwardly therefrom toward the contact area, with each of the slits terminating short of the contact area, with each of the slits extending to and through each of the lateral faces whereby, after at least one of the moving body and derivative of the moving body interacts with the contact area, energy of at least one of the moving body and derivative of the moving body is absorbed by the plate.

2. The mechanical energy absorber according to claim 1 wherein each of the slits extends radially relative to the contact area.

3. The mechanical energy absorber according to claim 1 wherein a first set of slits terminates at a first distance from the contact area, wherein a second set of slits terminate at a second distance from the contact area, wherein slits of the first set are disposed between slits of the second set, and wherein adjacent slits are disposed obliquely to each other such that flexural waves therebetween reflect obliquely to provide a tortuous path for return of a flexural wave to the contact area.

4. The mechanical energy absorber according to claim 1 wherein the slits define fictitious lines extending from the contact area, with adjacent first and second fictitious lines defining two sides of a three sided sector, and with the sector having a third side defined by the perimeter.

5. The mechanical energy absorber according to claim 4 wherein the first, second and third sides are linear such that the sector is generally a triangle.

6. The mechanical energy absorber according to claim 4 wherein the third side is nontangential to any fictitious circle having the contact area as its center such that any flexural wave emanating directly from the contact area when reflected by the third side is reflected in a direction other than directly back to the contact area.

7. The mechanical energy absorber according to claim 4 wherein a fictitious first ray portion emanating from the contact area and being offset from any of the slits intersects the perimeter at a first point and first angle, wherein a fictitious second ray portion reflective of the first ray portion at an equal angle emanates from the first point and intersects a first slit at a second point and second angle, wherein a fictitious third ray portion reflective of the second ray at an equal angle emanates from the second point and intersects a second slit adjacent to the first slit at a third point and third angle, and wherein such process continues between the first and second adjacent slits to generate fourth, fifth, sixth, seventh, eighth, ninth, tenth, and eleventh ray portions and to generate fourth, fifth, sixth, seventh, eighth, ninth and tenth points and angles, wherein the eleventh ray portion intersects the perimeter at an eleventh point and eleventh angle, and wherein a fictitious twelfth ray portion reflective of the eleventh ray portion at an equal angle emanates from the eleventh point in a direction back toward the contact area whereby a tortuous path is provided for flexural waves to return to the contact area.

8. The mechanical energy absorber according to claim 4 wherein a fictitious first ray emanating from the contact area and being offset from any of the slits reflects from the perimeter to a first slit, then reflects from the first slit to a second slit, then reflects between the second and first slits a multitude of times, whereupon the fictitious first ray is reflected to the perimeter and then reflected generally back toward the contact area to provide a tortuous path for flexural rays.

9. The mechanical energy absorber according to claim 1 wherein the plate has a generally central region and wherein the contact area is in the generally central region.

10. The mechanical energy absorber according to claim 1 wherein the plate comprises at least four side portions, with adjacent side portions extending at generally right angles to each other.

11. The mechanical energy absorber according to claim 1 wherein the plate comprises a side defining a fictitious straight line, with the fictitious straight line being tangential to a fictitious circle having the contact area as its center, and with one of the slits opening at the point where the fictitious straight line is tangential to the fictitious circle and wherein such slit extends radially inwardly to terminate adjacent to the contact area to minimize flexural waves from reflecting immediately back to the contact area.

12. The mechanical energy absorber according to claim 1 wherein the plate is generally flat.

13. The mechanical energy absorber according to claim 1 wherein the support engages the plate at least a portion of the perimeter.

14. The mechanical energy absorber according to claim 1 and further comprising a base engaged to the support, and a lever mechanism engaged to the base, with the lever mechanism comprising a lever which is at least partially disposed over the contact area for interacting with at least one of the moving body and derivative of the moving body to change the effective mass of at least one of the moving body and derivative of the moving body.

15. The mechanical energy absorber according to claim 14 and wherein the lever mechanism comprises a spring to mediate impact of at least one of the moving body and derivative of the moving body.

16. The mechanical energy absorber according to claim 14 wherein the lever comprises an end, with the end being disposed over the contact area and between at least one of the moving body and derivative of the moving body.

17. The mechanical energy absorber according to claim 14 and wherein the lever comprises an end and wherein the lever mechanism comprises a boss engaged with the contact area, with the boss including a receiver for the end of the lever, and with the end of the lever being freely engaged in the receiver.

18. The mechanical energy absorber according to claim 17 wherein the boss includes a cursed surface for engaging the contact area, with the curved surface curving away from the contact area so as to minimize contact between the boss and the contact area.

19. The mechanical energy absorber according to claim 1 and further comprising a boss on the contact area for interacting with at least one of the moving body and derivative of the moving body, and wherein the boss comprises two portions being drawable together to pinch a portion of the contact area therebetween, with each of the portions including one said curved surface so as to further engage the contact area while minimizing contact between the boss and the contact area.

20. A mechanical energy absorber for at least one of a moving body and a derivative of a moving body, comprising, in combination:

a) a support; and b) a plate engaged to the support and comprising a perimeter and a pair of lateral faces, with one of the lateral faces comprising a contact area for interacting with at least one of the moving body and derivative of the moving body, with the plate further comprising a sector which comprises first, second, and third edges, with the first and second edges extending transversely to any fictitious circle having the contact area as its center to interrupt a continuous circular band about the contact area, with the first and second edges extending obliquely relative to each other, and with the third edge being nontangential to any circle having as its center the contact area such that flexural waves introduced into the sector from the contact area are reflected in a direction other than directly back to the contact area.

* * * * *